Aug. 31, 1926.
J. H. BECKER
1,598,361
INDICATOR FOR PRESSURE GAUGES
Filed March 19, 1923
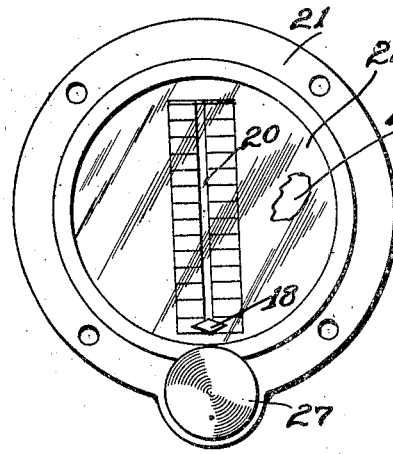
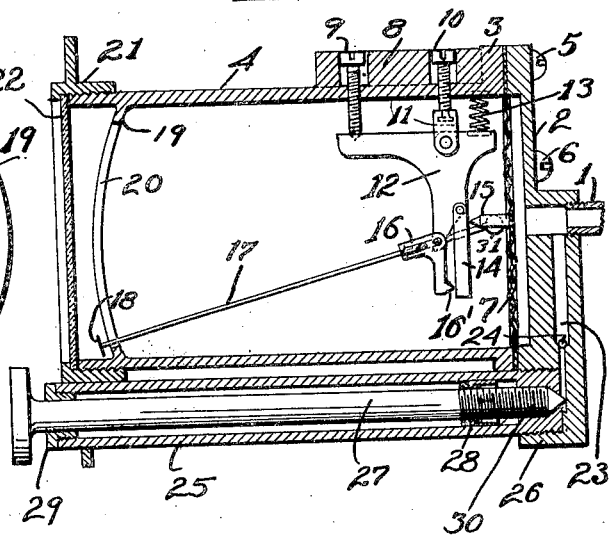
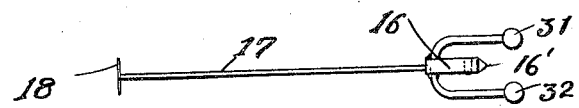
INVENTOR
Julius H. Becker
By
Carlos P. Griffin
ATTORNEY Patented Aug. 31, 1926.

1,598,361

UNITED STATES PATENT OFFICE.

JULIUS H. BECKER, OF SAN FRANCISCO, CALIFORNIA, ASSIGNOR OF ONE-HALF TO WALTER ARNSTEIN, OF SAN FRANCISCO, CALIFORNIA.

INDICATOR FOR PRESSURE GAUGES.

Application filed March 19, 1923. Serial No. 626,035.

This invention relates to an indicator for pressure gauges, and its object is to provide a simple and strong gauge construction which will remain accurate notwithstanding the comparatively rough usage to which it will be put.

Another object of the invention is to provide means whereby the pressure pipe line may be filled with air should it accidentally, or through absorption, lose the air ordinarily entrapped therein.

This gauge is intended primarily for the purpose of measuring the depth of fluid in a tank by means of an open pressure tube, for which purpose the air-pressure pump is attached to the gauge. It may also be used for the purpose of measuring any desired pressure, and is capable of adjustment through a considerable range of pressures where that becomes necessary.

Other objects of the invention will appear as the description proceeds.

An embodiment of the invention is shown in the accompanying drawings, in which the same reference numeral is applied to the same portion throughout, but I am aware that there may be modifications thereof.

Fig. 1 is a front elevation of the apparatus as it appears attached to the dash-board of an automobile, Fig. 2 is a vertical longitudinal sectional view of the apparatus, and Fig. 3 is a detail of the levers for suspending the indicator arm.

The pressure pipe is indicated at 1, and is connected to a detachable head 2, which is secured to the end flange 3 of a substantially cylindrical casing 4.

Screws 5 and 6, in such number as may be required, are used to connect the head 2 to the casing, and such a number of them are used as will make an air-tight joint with the corrugated diaphragm 7.

The casing has a raised boss at 8 within which two screws 9 and 10 are concealed. The screw 10 is connected to a yoke 11, to which the bell-crank lever 12 is connected. This bell-crank lever has a spring 13 to hold its longer end in contact with the lower end of the screw 9.

Depending from the lower end of the bell-crank 12 is a pivotally supported straight bar 14. This bar bears against a point of the stud 15 secured in the center of the diaphragm 7.

Somewhat below the pivot point of the bar 14 there is a smaller bell-crank 16 pivotally mounted on the lower end of the bell-crank 12. This bell-crank 16 has a rod 17 secured thereto which rod terminates in an indicator at 18.

The front of the casing is closed by means of the curved partition 19 through which the slot 20 extends, the glass front 22 being broken away in Fig. 1 to show said partition. A flanged ring 21 is screwed on the end of the casing and holds the glass 22 in place to permit the indicator to be observed.

Extending downwardly from the end of the pressure inlet pipe is an opening 23, which has a small check ball valve 24 therein. The flanged ring 21 has an opening therethrough, through which a tube 25 can be inserted and which tube is screwed into the boss 26 formed on the lower part of the disc 2.

A plunger 27 extends into the tube 25 and has suitable piston packing at 28 and a retaining bushing 29 is screwed into the end of the tube 25.

When not in use the plunger 27 is screwed into the bottom of the tube 25 by means of the threads indicated at 30.

In order to completely counter-balance the weight of the arm 17 there are two small weights, 31, 32, at the right of the pivot point of the bell crank 16, which latter bears upon the lever 14 at 16'.

The operation of the apparatus is as follows:

Assuming the pressure to be applied from any source to the pipe 1, the diaphragm 7 will be forced forward, and in turn push the lever 14 forward, the movement of the stud 15 being multiplied in accordance with the position that stud occupies with respect to the pivot point of the lever 14.

In order to vary the movement of the arm 17 the screw 10 is moved up or down as may be required, while to set the indicator 18 at zero, the screw 9 is manipulated.

In the event of the absorption of or loss of air in the chamber behind the diaphragm, from any cause, the air may be replaced by operating the pump plunger 27 for several strokes, after which it is restored to the position shown in Figure 1, to prevent the further loss of air from the diaphragm chamber.

It will be noted that the construction herein described is intended to compensate the operation of the indicator hand throughout its movement with respect to the increasing stiffness of the diaphragm, that is, as the stud on the diaphragm moves outwardly its contact with the lever stiffens the lever arm and at the same time increases the length of the lever arm on the small bell-crank thereby making substantially uniform calibrations on the scale to indicate uniform changes of pressure within the pressure casing.

What I claim is as follows, but modifications may be made in carrying out the invention shown in the drawings and in the above particularly described form thereof, within the purview of the invention.

1. An indicator for fluid pressures, comprising a receptacle covered with a diaphragm, means to allow pressure to be applied to one side of said diaphragm, a pivotally mounted bell crank, a rotatable adjusting mechanism for said bell crank, a spring to hold said bell crank in engagement with said rotatable adjustment, means to vertically adjust the position of said bell crank, a pivoted bar depending from said bell crank and adapted to contact with a pointed stud on said diaphragm, a smaller bell crank pivoted to said bell crank, one arm of which having an indicating rod, and the other arm contacting with said depending bar.

2. An indicator for pressure gauges comprising a casing having a detachable head, a diaphragm held in place by said head, a pointed stud on said diaphragm, a bearing yoke, means to vertically adjust it, a bell crank pivoted on said yoke, an adjusting screw adapted to move said bell crank on its pivot, a spring adapted to hold the bell crank in contact with said adjusting screw, a bar pivoted on, and depending from said bell crank, said bar adapted to contact with said pointed stud, a smaller bell crank pivoted on said bell crank having one of its arms contacting with said bar and the other arm carrying a rod on which an indicator is fixed, said rod being guided by a slot in a curved partition in said casing, and a glass front for said casing.

3. An indicator for pressure gauges comprising a casing having a detachable head, a diaphragm held in place by said head, a pressure pipe connected to said head, an air pump carried by said casing and having air passages leading to said pressure pipe and said diaphragm whereby the pressure in said pipe is maintained, a bell crank having a vertical and a horizontal arm, a yoke on which the horizontal arm is pivoted, a screw swiveled in said yoke and extending through the wall of said casing and being adapted to adjust said bell crank vertically, an adjusting screw extending through the wall of said casing and bearing on the end of said horizontal arm and being adapted to tilt said bell crank, a spring bearing on the other end of said horizontal arm and tending to hold said arm in contact with said adjusting screw, a bar pivoted to said vertical arm and depending therefrom in front of said diaphragm, a pin on the diaphragm bearing on said pivoted bar, a smaller bell crank pivoted on said vertical arm, one arm of which has a pointed end bearing on said bar, the other arm having an indicator rod.

In testimony whereof I have hereunto set my hand this 10th day of March, A. D. 1923.

JULIUS H. BECKER.